United States Patent
Kunststofftechniker

[15] 3,661,630
[45] May 9, 1972

[54] WELDABLE POLYURETHANE FOAM AND PROCESS FOR MANUFACTURE

[72] Inventor: Hans-Jurgen Remmert Kunststofftechniker, Wiesbaden, Germany

[73] Assignee: Firma Rudolph Koepp & Co., Chemische Fabrik AG

[22] Filed: July 10, 1969

[21] Appl. No.: 840,824

[30] Foreign Application Priority Data

July 19, 1969 Germany..................P 17 69 819.0

[52] U.S. Cl.....................117/138.8 D, 117/98, 117/122 H, 117/161 UH, 156/272, 161/190
[51] Int. Cl..................................B32b 27/40, C08j 1/30
[58] Field of Search............117/138.8 D, 98, 122 H, 161 UH

[56] References Cited

UNITED STATES PATENTS

| | | | |
|---|---|---|---|
| 3,109,750 | 11/1963 | Roche | 117/98 F |
| 3,269,887 | 8/1966 | Windecker | 117/98 F |
| 3,355,316 | 11/1967 | Hellman et al. | 117/98 F |
| 3,360,415 | 12/1967 | Hellman et al. | 117/98 F |
| 3,393,119 | 7/1968 | Dugan | 117/98 F |
| 3,397,079 | 8/1968 | DePugh et al. | 117/122 H |
| 3,468,703 | 9/1969 | Gibbs et al. | 117/122 H |

*Primary Examiner*—William D. Martin
*Assistant Examiner*—Ralph Husack
*Attorney*—Burgess, Dinklage & Sprung

[57] ABSTRACT

Polyurethane foam of open pore structure is sized with a vinylidene chloride polymer to improve weladability thereof.

16 Claims, No Drawings

WELDABLE POLYURETHANE FOAM AND PROCESS FOR MANUFACTURE

BACKGROUND

The present invention relates to weldable, especially high-frequency-weldable, articles, for example, boards, made from foam materials, preferably soft foam materials, particularly polyurethane foams, hereinafter referred to as PU foams, which are sized with thermoplastic synthetic resins, as well as methods for their manufacture.

PU foams, viz. those based on polyesters as well as those based on polyethers are known and described, for example, in "Kunstoff-Handbuch," Vol. VII, Polyurethane, Herstellung, Eigenschaften und Verwendung, Carl Hauser Verlag, Munich 1966, pp. 25–28 and pp. 422–447.

It is in the prior art in the manufacture of PU foams to add to the reaction mixture thermoplastic synthetic resins on a basis of polymeric vinyl compounds, especially PVC (polyvinyl chloride), alone or together with plasticizers, in quantities amounting to at least 10 percent of the polyol, and to foam them together with the PU. Foams prepared in this manner can be welded by high-frequency methods. One difficulty of this process lies in sufficiently stabilizing the thermoplastic component against the long-enduring high core temperature produced in the foam blocks in their manufacture. In the framework of this proposal, therefore, it is also recommended that the finished PU foam be treated, for example, with a solution of the synthetic resin.

It is furthermore in the prior art to improve the weldability of PU foams on an ester basis by dissolving out parts of the cell substance by means of alkaline agents. This procedure is very expensive, and the resulting foam is undesirably altered in its properties.

It has also been proposed to size open-pored PU foams, or PU foams that have been rendered open-pored, with considerable quantities of thermoplastic synthetic resins, with or without plasticizers, these artificial resins being in dispersion or plastisol form, followed by drying and/or setting. In the subsequent high-frequency welding process, these synthetic resins envelop the polyurethane skeleton of the foam, which does not participate in the welding itself, and they melt to form a seam. For the practice of this method, which is done mostly with soft PVC, quantities of synthetic resin amounting to over 40 percent of the foam weight are necessary, which very greatly modify the properties of the foam in an undesirable manner. To counteract this disadvantage at least in part, it has been proposed to incorporate into the foam and set, and then foam into the cells, not merely a soft PVC composition, but one containing a blowing agent, it being stated that this results in better adhesion and better physical characteristics. Since it is difficult, however, to heat a relatively thick layer of foam uniformly to the high temperature required for the blowing agent to work, this method is limited substantially to a surface-treating procedure.

Lastly, it is in the prior art to size or impregnate open-pored PU foams, or PU foams that have been rendered open-pored, with limited quantities (about 10 to 30 percent of the weight of the foam) of polymeric vinyl compounds, such as polyvinyl acetate and PVC, in the form of solutions, dispersions or plastisols, and then dry and/or set them. In the subsequent high-frequency welding, these synthetic resins cement the compressed foam skeleton in the manner of a fusing adhesive, and also cement covering sheet materials and the like to the seam. This method can be used in polyester-type foams, which in turn deform permanently in the area of the seam at the usual welding temperature, providing high-temperature stability is not expected of the seams. When used in the case of polyether type PU foams, which to a great extent retain their elasticity and shape at the welding temperature, this procedure does not produce acceptable results.

When a relatively low-melting mixed polyamide is used as a sizing agent and fusing adhesive in the manner described above, good results are achieved even in the case of polyurethane polyether foams, but such plastics are difficult to distribute among the cells, and even in very small percentages they considerably stiffen the foam. Furthermore, the suitable polyamides are available only in the form of solutions in organic solvents, not in the form of dispersions, thus resulting in additional difficulties.

THE INVENTION

The present invention relates to a PU foam, especially those on a polyether basis, which is sized with a certain synthetic resin which fuses (heat seals) in the high-frequency field, and which is distributed through the cellular skeleton of the foam in the form of an adherent, uniform coating, and it relates also to a process for the preparation of such a foam. In particular, the present invention relates to a sized polyurethane foam, especially polyether polyurethane, which is of such a nature that its physical properties are not undesirably modified in comparison with the untreated PU foam used for the purpose. The treated PU foam of the invention can be bonded in the high-frequency field to itself and to other high frequency weldable materials, with a normal consumption of energy. The bonds thus produced have a strength matching that of the bonded materials, and the seams are not broken by aging or by the influence of high temperatures.

It has surprisingly been found that open-pored foam on a polyether polyurethane basis, which has been sized with small amounts of polyvinylidene chloride (polymers of $H_2C=CCl_2$, hereinafter called PVDC) or copolymers thereof, especially on an acrylic acid ester or PVC basis, is outstandingly weldable (heat sealable). It has been found that quantities of as little as 6 to 8 percent of the weight of the foam suffice for the achievement of stable high-frequency welds to soft PVC sheet materials. It has furthermore been found that the strength of these welds is not diminished by aging and that they do not deteriorate or open even after long exposure to temperatures of up to 90° C. It has also been found that the technical properties of the polyether polyurethane foam are not adversely affected by the necessary small amounts of PVDC that adhere to the cell walls of the foam.

The subject of the invention is accordingly an open-pored, preferably soft-elastic, polyurethane, especially polyether polyurethane, foam material, which to improve its weldability is sized with a thermoplastic synthetic resin, the new foam material being characterized by the fact that PVDC polymer (which includes PVDC copolymers) with a sealing temperature (i.e., heat sealing temperature) of at least about 100° C. are present as the thermoplastic synthetic resin. Other open-pored foams such as ester-based polyurethane foams are also suitable, but the principal advantages of the invention lie in the use of polyether polyurethane foam. The foam that is used can be in the form of boards, sheets or special shapes, thicknesses of up to about 100 mm. being preferred.

The PVDC used for the sizing of the foam can be either the homopolymer or in the form of a copolymer or of a mixture thereof, and it may also incorporate conventional plasticizers, if desired. Preference is given to copolymers of PVDC with acrylic acid derivatives, especially acrylic acid esters and acrylates or vinyl chloride, with a content of vinylidene chloride moieties of at least 60 percent, but preferably over 80 percent. The sealing temperature of the coating made therefrom is best above about 100° C., but preferably around 140° C. The quantity of the thermoplastic amounts preferably to 3 to 30 percent by weight, preferably 5 to 20 percent by weight, with reference in each case to the unsized foam. Good results are obtained with quantities of even less than 10 percent thermoplastic by weight.

In the sizing of the foam, the preformed PU foam is preferably treated with a suitable preparation of the synthetic resin, e.g., the resin contained in a carrier medium. This synthetic resin is to be preferably in the form of an aqueous dispersion, but it can also be used in paste or solution form. Hydrogen chloride absorbing additives can also be used for the stabilization of the synthetic resin, as in the prior art of the working of PVC.

The impregnation of the foam is performed by uniformly impregnating it with the dispersion or with the paste or solution of the PVDC or its copolymer by imbibition, spraying it on, milling and centrifugal impregnation, or by the application of a vacuum, then evaporating the solvent or dispersing agent, while the foam with the synthetic resin residue is heated to the coating formation temperature of the PVDC or the corresponding copolymer.

Foam manufactured according to the invention in this manner can be bonded in the high-frequency field, under known conditions, to itself, to other weldable foams, to weldable sheets, fabrics or mats, or to the surfaces of sheet materials or textiles which have been treated to make them weldable by high frequency. The strength of the weld, if it is skillfully executed, is close to the strength of the foam that is used. Since the blocking point, i.e., the temperature at which the foam bonds to itself if a load is applied, and the thermal resistance of the weld depend upon the properties of the synthetic resin used for the sizing, high-frequency-weldable foams whose temperature stability is within the range of practical use of plasticized PVC can be prepared if proper selection is made of the type of PVDC or copolymer.

It is also possible to bond foam boards to one another and to other weldable materials by other welding processes, e.g., by thermal pulse welding, or in a recoolable molding press. In this case, as in case of the high-frequency method, it is possible, by properly designing the mold jaws or electrodes, to form a scored line alongside the welding seam for easy tearing.

In the process of sizing the PU foam, foam is preferably first thoroughly impregnated according to the invention with the dispersion or a solution of the PVDC or of at least one of its copolymers. The liquid phase is then evaporated and the foam is heated to such an extent that the individual synthetic resin particles partially flow together and adhere to the foam skeleton. It has surprisingly been found that, for the achievement of this state, it is by no means necessary to produce the sealing temperature of the synthetic resin. Even at moderately elevated temperatures, this process of the partial flowing together of the foam particles and the adherence of this coating to the PU foam skeleton takes place. The PU foam prepared in this manner can then be further worked by conventional methods.

The advantage of the use of PVDC or its copolymers over the PVC impregnations that have been used almost exclusively to date lies principally in the greater tensile strength of the welding seam, especially after aging (24 hours at 90° C.). This situation is apparent from the following comparison:

| Composition of the Impregnating agent (% content of PVC or PVDC) Impregnation | Failure after aging for 24 hrs., 90°C, in kgs. per 5 cm. of seam | |
|---|---|---|
| | 10 wt-% | 20 wt.-% |
| PVDC/acrylic acid derivative, approx. 92% PVDC | 2.8 | 3.8 |
| Plain PVDC, approx. 98% | 3.4 | 3.5 |
| Plasticized PVC, 18% plasticizer | 0.4 | 1.3 |
| Plasticized PVC, 35% plasticizer | 0.7 | 0.8 |
| PVC/PVA | 1.1 | |

EXAMPLE 1

A board measuring 1200 × 600 × 5 mm. made of an open-pored polyether polyurethane foam and having a weight of approximately 100 grams is uniformly impregnated with the same weight of a 10 percent aqueous dispersion of a PVDC-acrylic acid ester copolymer having a PVDC content of about 90 percent, and is dried at 100° C. A corresponding solution of PVDC in a solvent or a PVDC paste which is especially an aqueous paste may be used in place of the aqueous dispersion. The sized foam thus obtained is welded between a sheet of plasticized PVC and a high-frequency-weldable lacquered paperboard in the corresponding mold, so that an inside trim panel of an automobile door is produced.

The weld seams have a breakaway strength (DIN 53530) of more than 600 ponds in the direction of the seam at a 2 mm. seam width and they do not lose this strength after artificial aging for 24 hours at 84° C.

A coating made of a PVDC copolymer was also used as the high-frequency welding coating on the paperboard.

EXAMPLE 2

A board 20 mm. thick made of open-pored polyether PU foam and having a density of about 25 kgs./cubic meter is imbibed with a 15 percent aqueous dispersion of a PVDC-PVC copolymer having a PVDC content of 70 percent, and is squeezed out between rolls to such an extent that a residual amount of 12 percent of synthetic resin based on the weight of the foam remains in the board. The impregnated foam is dried at 100° C. and continuously pressed between two sheets of plasticized PVC in a high-frequency field in a chair cushion mold with pinch-off edges. In this manner, cushions are obtained from continuous material, which can also be given quilt-like decoration and other patterns by designing the mold accordingly.

EXAMPLE 3

A percent 60 mm. thick board of polyether polyurethane foam having a density of about 18 kgs. per cubic meter is soaked with a 30 aqueous dispersion of PVDC-PVC copolymer containing 70 percent of PVDC and squeezed out to retain about 25 percent of resin based on the foam weight. After drying at 80° C., a soft-elastic, excellent, high-frequency-weldable foam board is obtained.

If this foam is welded between two appropriately imprinted sheets of plasticized PVC between forming electrodes having pinch-off edges shaped, for example, as a doll or toy animal, a plastic toy which can be washed off is obtained in a single operation.

The high-frequency bonds made with the foam described above have an outstanding breakaway strength (DIN 53 530) which is better than 1 kg. per linear centimeter of seam when tearing off vertically, i.e., applying a force in a direction perpendicular to the seam and to the plane of the board.

EXAMPLE 4

A board of 200 × 200 × 10 mm. of a polyester polyurethane foam having a density of about 18 kgs./cu.m. and a weight of 7.2 g. is soaked with an aqueous dispersion of 0.8 g. of a copolymer of PVDC and acrylic acid ester in 10 g. of water. The copolymer contains 90 percent by weight of pVDC.

The impregnated foam is dried at a temperature of 100° C. and welded against a PVC film of 0.6 mm. in thickness consisting of plasticized PVC containing 40 percent of plasticizer, said welding being effected in a high frequency field.

The welding seam obtained is stable on artificial aging at 85° C. for 24 hours and has a strength of 520 ponds per linear centimeter in the breakaway test according to DIN 53 530.

EXAMPLE 5

A sheet of 200 × 200 × 50 mm. of a polyester polyurethane foam having a density of about 30 kgs./cu.m. and a weight of 60 g. is soaked with a 15 percent aqueous dispersion of a PVDC/acrylate copolymer having a PVDC content of 90 percent by weight and dried at 100° C.

The impregnated foam thus prepared contains 13.5 percent by weight of PVDC based on the weight of the original foam.

The impregnated foam is welded in a high-frequency field between two PVC films being 0.5 mm. thick and containing about 45 percent of plasticizer. The weld obtained is stable when aged at 85° C. for 24 hours and has a peeling strength of more than 600 ponds/linear cm. seam according to DIN 53 530.

What is claimed is:

1. Polyurethane foam of open pore structure and sized with a polymer of dry uniform coating of vinylidene chloride to improve the weldability thereof, the polymer content of vinylidene chloride moieties being at least 60 percent.

2. Polyurethane foam according to claim 1, said polyurethane being a polyether polyurethane.

3. Polyurethane foam according to claim 1, said polymer of vinylidene chloride having a sealing temperature of at least about 100° C.

4. Polyurethane foam according to claim 1, said polymer of vinylidene chloride being a copolymer vinylidene chloride and a vinyl monomer.

5. Polyurethane foam according to claim 4, said vinyl monomer being an acrylic acid ester.

6. Polyurethane foam according to claim 4, said monomer being vinyl chloride.

7. Polyurethane foam according to claim 1, the amount of polymer of vinylidene chloride being about 3–30 weight percent with reference to the weight of the unsized foam.

8. Polyurethane foam according to claim 7, the polymer content of vinylidene chloride moieties being at least 80 percent.

9. Polyurethane foam according to claim 1, the polymer content of vinylidene chloride moieties being at least 80 percent.

10. Polyurethane foam according to claim 1, the amount of polymer of vinylidene chloride being about 5–20 weight percent with reference to the weight of the unsized foam.

11. Polyurethane foam according to claim 10, the polymer content of vinylidene chloride moieties being at least 80 percent.

12. Process for the manufacture of polyurethane foam sized to impart weldability thereto, which comprises:
    a. impregnating the foam with polymer of vinylidene chloride contained in a carrier medium, the polymer content of the vinylidene chloride moieties being at least 60 percent;
    b. drying the impregnated foam to expel the carrier medium and deposit the polymer in the foam;
    c. heating the foam and deposited polymer so that the polymer flows together and adheres to the foam as a uniform coating thereon.

13. Process for the manufacture of polyurethane foam sized to impart weldability thereto, which comprises:
    a. impregnating the foam with polymer of vinylidene chloride having a vinylidene chloride content of at least 60 percent;

14. Process according to claim 13, the polymer content of vinylidene chloride moieties being at least 60 percent.

15. Process according to claim 14, the polyurethane foam being a polyether polyurethane.

16. Process according to claim 13, the polyurethane foam being a polyether polyurethane.

* * * * *

PO-1050
(5/69)

UNITED STATES PATENT OFFICE
CERTIFICATE OF CORRECTION

Patent No. 3,661,630      Dated May 9, 1972

Inventor(s) Hans-Jurgen Remmert

It is certified that error appears in the above-identified patent and that said Letters Patent are hereby corrected as shown below:

Col. 6, line 21, (claim 13, line 5), following that line insert:

--b. heating the foam and said impregnating polymer so that the polymer flows together and adheres to the foam as a uniform coating thereon.--

Signed and sealed this 26th day of September 1972.

(SEAL)
Attest:

EDWARD M. FLETCHER, JR.           ROBERT GOTTSCHALK
Attesting Officer                    Commissioner of Patents

UNITED STATES PATENT OFFICE
CERTIFICATE OF CORRECTION

Patent No. 3,661,630　　　　　　　　Dated May 9, 1972

Inventor(s) Hans-Jurgen Remmert

It is certified that error appears in the above-identified patent and that said Letters Patent are hereby corrected as shown below:

Title page under [30] Foreign Application Priority Data change "1969" should read -- 1968 --.

Signed and sealed this 6th day of March 1973.

(SEAL)
Attest:

EDWARD M. FLETCHER, JR.　　　　　ROBERT GOTTSCHALK
Attesting Officer　　　　　　　　Commissioner of Patents